Patented Nov. 13, 1928.

1,691,065

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

PROCESS OF MAKING DIPOLYMER.

No Drawing.   Application filed July 20, 1926. Serial No. 123,811.

The object of my invention is to produce Dipolymer.

Dipolymer, as the term is herein employed, is a product, consisting of polymerized terpene hydrocarbons, which is obtained by polymerizing turpentine, dipentene or pine oil. Although it is largely composed of the Dipolymer $(C_{10}H_{16})_2$, substantial proportions of higher polymers, $(C_{10}H_{16})_n$, are generally present. Dipentene, as the term is herein employed, refers to the cut of pine products boiling largely between 165 and 185° C., which is obtained in the steam distillation of pine wood. Pure dipentene boils at 174–6° C., but the term dipentene as herein used is intended to comprehend the crude product with the greater boiling range.

It is known to make Dipolymer in the liquid phase by treating turpentine or dipentene with sulfuric acid of various concentrations. I have discovered that it may be prepared, by a simple and economical new process, from pine oil. I have discovered that it may be made either in the liquid phase or the vapor phase—in the former case by treatment with fuller's earth, or an equivalent polymerizing agent, and in the latter case by a somewhat different process in which the use of fuller's earth or equivalent polymerizing agent is desirable, but not indispensable, and functions as a catalyst.

In the case of pine oil, which consists largely of tertiary terpene alcohols, the fuller's earth causes two reactions: (1) dehydration of the pine oil to dipentene and other hydrocarbons, as

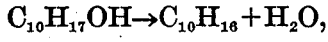

$$C_{10}H_{17}OH \rightarrow C_{10}H_{16} + H_2O,$$

and (2) a polymerization of the hydrocarbons to the Dipolymer plus a smaller proportion of the higher polymers, as:

$$xC_{10}H_{16} = (C_{10}H_{16})_2 + (C_{10}H_{16})_x.$$

Pine oil may be heated with almost any proportion of fuller's earth and largely converted into Dipolymer. The degree of conversion depends upon the proportion of fuller's earth, the activity of the fuller's earth, the temperature used and the time of heating. Below 130° C. the rate of dehydration of pine oil is slow, but at temperatures about 145–225° C. the conversion to dipentene and subsequent polymerization is fairly rapid. The time required may be shortened by heating under pressure, but at temperatures above 250° C. a depolymerization is noticeable. It is usually of advantage to allow the water formed during the process to distill off during the operation. The earth may be re-used.

For example, 400 parts of pine oil are heated with 100 parts of fuller's earth in a batch held at 160–170° C. for eight hours. After cooling, which is always preferable, but may be in some cases omitted, the product is filtered or otherwise separated from the fuller's earth and then distilled, 125 parts distilling below 250° C. The residue is Dipolymer. A portion of the lower boiling fraction can be converted into Dipolymer by again treating it with fuller's earth, but a large proportion of non-polymerizable hydrocarbons, including para-cymene, is present. The bath may be held at higher temperatures in order to decrease the period of heating. The pine oil may be refluxed with the fuller's earth.

Other clays, or silicious or argillaceous earths, such as filtrol, and heated oxides, such as aluminum oxide may be substituted for fuller's earth.

The crude product which is obtained on polymerizing pine oil may be employed, in some instances, without refining; but it is usually preferable to distill off the lower boiling end, cutting around 250° C. By this procedure, the hydrocarbons and any unaltered pine oil are separated, leaving a residue consisting of crude Dipolymer.

Polymerization in the vapor phase may be carried out at temperatures ranging from 200–550° C. by passing the vapors of pine oil through a tube of iron or other suitable material at such a rate as will permit the vapors to remain in contact with a catalyst, contained in the tube, long enough to cause a partial polymerization. Heat alone will cause polymerization, but a catalyst, such as fuller's earth, is desirable. For example, through an iron tube 28" x 1", heated to around 475° C., filled with 8–10 mesh fuller's earth, is passed 275 cc. of pine oil at a rate of 50 cc. per hour. There were obtained 166 parts of a product containing 44 parts of Dipolymer.

A typical sample of crude Dipolymer has a specific gravity of 0.95, and the following boiling range: 5% over at 305° C., 20% at 326° C., 50% at 335° C., 70% at 342° C. and 90% at 375° C. If a cut is made when approximately 80% has distilled over, a product is obtained having a specific gravity of 0.94. A second cut may be made comprising approximately the 80–95% portion of the crude Dipolymer. This cut is exceedingly viscous and resembles a soft rosin. The residue is hard and brittle and has the appearance of a dark colored rosin. For some applications of the Dipolymer it may be desirable to separate it into cuts as outlined above.

I do not herein claim the above described preparation of Dipolymer in the vapor phase, as the same forms the subject-matter of a separate application.

Having now fully described my invention, what I claim and desire to protect by Letters Patent is:

1. The process of preparing Dipolymer from pine oil which includes heating pine oil in a liquid phase with a catalyst for such length of time and at such temperature as will effect dehydration and finally polymerization of a substantial part of the pine oil.

2. The process of preparing Dipolymer from pine oil which includes heating pine oil with a catalyst to effect dehydration and finally polymerization of a substantial part of the pine oil, separating out the polymerized product, and reheating to the temperature required to vaporize the lower boiling fraction of the same, leaving a residue which comprises principally Dipolymer.

3. The process of preparing Dipolymer from pine oil which includes heating pine oil with a catalyst to effect dehydration and finally polymerization of a substantial part of the pine oil, separating out the polymerized product, and reheating to the temperature required to vaporize the lower boiling fraction of the same, leaving a residue which comprises principally Dipolymer, and then subjecting the lower boiling fraction to a similar treatment with a catalyst followed by similar separation and distillation to convert a part of the lower boiling fraction into Dipolymer.

4. The process of preparing Dipolymer from pine oil which includes heating pine oil with a fractional part of its weight of a catalyst to effect dehydration and finally polymerization of a substantial part of the pine oil, separating out the polymerized product, and reheating to the substantially higher temperature required to vaporize the lower boiling fraction of the same, leaving a residue which comprises principally Dipolymer.

5. The process of preparing Dipolymer from pine oil which includes heating pine oil with a catalyst to effect dehydration and finally polymerization of a substantial part of the pine oil, separating out the polymerized product, and fractionally distilling the same at temperatures adapted to yield products having specific gravities progressively lower than .96.

6. The process of preparing Dipolymer from pine oil which includes heating pine oil with fuller's earth for such length of time and at such temperature as will effect polymerization of a substantial part of the pine oil.

7. The process of preparing "Dipolymer" which includes subjecting pine oil to heat and the action of a neutral catalyst to effect dehydration and finally polymerization of a substantial proportion of the pine oil.

8. The process of preparing "Dipolymer" which includes subjecting pine oil to heat and the action of fuller's earth.

In testimony of which invention, I have hereunto set my hand, at Philadelphia, Pennsylvania, on this 2nd day of July, 1926.

IRVIN W. HUMPHREY.